UNITED STATES PATENT OFFICE.

JEAN HUSSON, OF BERNE, SWITZERLAND.

SOIL MIXTURE FOR A FORCED GROWING OF POTATOES AND METHOD FOR ITS MANUFACTURE.

1,417,248.   Specification of Letters Patent.   Patented May 23, 1922.

No Drawing.   Application filed December 28, 1920.   Serial No. 433,670.

*To all whom it may concern:*

Be it known that I, JEAN HUSSON, a citizen of Switzerland, residing at Berne, Canton of Berne, in the Confederation of Switzerland, have invented certain new and useful Improvements in Soil Mixture for a Forced Growing of Potatoes and Methods for Its Manufacture, (for which I have filed an application in Switzerland Dec. 26, 1919,) of which the following is a specification.

The object of the invention is a particular soil mixture adapted to an artifical or forced growing of potatoes and comprises also a method for its manufacture.

This soil mixture is made of a soil of sandy structure to which a manure is added containing at least a nitrogenous substance, a phosphatic substance and a salt of potassium. The mixture when complete is to contain from 2 to 3% of nitrogen; 3 to 4% of phosphoric acid, soluble in water ($H_3PO_4$) and 1 to 2% of potassium ($K_2O$).

The nitrogenous substance may be constituted by ammonium-sulphate, the phosphatic substance by superphosphate of calcium; chloride of potassium, sulphate of manganese and wood ashes may be added. The sandy soil may preferably contain more than 70% of sand.

For preparing the mixture forming the subject matter of this invention the nitrogenous and the phosphatic substance and the other salts are mixed in a dry state and of fine division. To the mixture obtained the soil containing at least 70% of sand is added. The final mixture is for eight days exposed to the air, then watered and left to dry.

This mixture is adapted to a forced or artificial culture of potatoes in dark rooms such as a cellar, an attic or the like.

Hereafter an example is given showing in which manner the mixture according to this invention may be prepared and utilized.

First of all the manure is prepared by mixing on a clean and plain surface—

150 kg. (336 lbs.) of ammonium sulphate,
200 kg. (448 lbs.) of superphosphate of calcium,
40 kg. (90 lbs.) of chloride of potassium,
20 kg. (45 lbs.) of sulphate of manganese,
20 kg. (45 lbs.) of wood ashes.

These ingredients are preferably spread out in thin layers one above the other until the mixture attains a height of 25 to 30 cm. (10 to 12 inches). Then the whole is put on a heap which by the help of a shovel is thoroughly worked over and mixed. In order to obtain a good mixture of these parts they should not contain any lumps. If the ingredients were damp a sticky mass would result of unequal composition and which it would be difficult to spread out.

The manure thus obtained is thereupon mixed with 570 kg. (1275 lbs.) of finely sifted, dry and sandy soil containing at least 70% of sand.

The whole is thoroughly mixed by working it with a shovel and then the mixture is for eight days exposed to the open air to become thoroughly aerated, and to permit the oxidizable elements in it to become oxidized. It is then freely watered if in the meantime the mixture has not been wet by rain. It is next left to perfectly dry and then is finally sifted until it becomes a very fine powder. In order to facilitate the drying, the soil is daily stirred and worked over with a shovel.

In order to artificially grow potatoes with this mixture it is spread out about 10 to 15 cm. (5 to 7 inches) high in a dark room the temperature of which will never be lower than 10° C. (50° F.) and which may be a cellar, an attic or a shed or the like. As much as 2 lbs. per square foot of potatoes of any kind whatever, but which are perfectly sound and have not yet sprouted, are set. After a few days, the number of which depends upon the quality and the particular kind of the potatoes used and the temperature prevailing in the room, the mother potato begins to sprout. When the sprouts have accquired a length of about ¼ of an inch they are cut exactly above the swelling of the sprout.

A few days later on the sprouts have become small potatoes whose growth proceeds very rapidly. After some weeks healthy and savory potatoes may be gathered which are comparable in every way with those grown in the usual manner. After the first crop the mother-potato is to be left at rest for it continues to germinate and a second crop and even a third one may be obtained before the mother-potato is fully consumed.

What I claim is:

1. A soil mixture adapted for the artificial and forced growing of potatoes containing sand and a manure comprising a nitrogenous and a phosphatic substance and a salt of potassium in the following proportion: 2 to 3% of nitrogen, 3 to 4% of phosphoric acid soluble in water, 1 to 2% of potash.

2. A soil mixture adapted for the artificial and forced growing of potatoes containing sand and a manure comprising a nitrogenous and a phosphatic substance and a salt of potassium in the following proportion: 2 to 3% of nitrogen, 3 to 4% of phosphoric acid soluble in water, 1 to 2% of potash, said ingredients of the manure being ammonium sulphate, superphosphate of calcium and chloride of potassium, sulphate of manganese and wood ashes.

3. A soil mixture adapted for the artificial and forced growing of potatoes consisting of at least 70% of sand and containing a manure comprising a nitrogenous and a phosphatic substance and a salt of potassium in the following proportion: 2 to 3% of nitrogen, 3 to 4% of phosphoric acid soluble in water, 1 to 2% of potash.

4. A soil mixture adapted for artificial and forced growing of potatoes containing sand and a manure and comprising 150 units of weight of ammonium sulphate, 200 units of weight of superphosphate of calcium, 40 units of weight of chloride of potassium, 20 units of weight of manganese sulphate, 20 units of weight of wood ashes, 570 units of weight of sandy soil containing at least 70% of sand.

5. The method which consists in first making a manure by mixing nitrogenous, phosphatic and potassium bearing substances and in adding to the manure thus obtained sandy soil containing at least 70% of sand, in leaving the mixture tranquil for eight days, watering and subsequently drying it.

In testimony whereof I have affixed my signature in presence of two witnesses.

JEAN HUSSON.

Witnesses:
  E. M. HERRMANN,
  D. SEBI.